(12) United States Patent
Mackal

(10) Patent No.: US 7,096,884 B2
(45) Date of Patent: Aug. 29, 2006

(54) CHECK VALVE

(75) Inventor: Glenn H. Mackal, St. Petersburg, FL (US)

(73) Assignee: Halkey Roberts Corporation, St. Petersburg, FL (US)

( * ) Notice: Subject to any disclaimer, the term of this patent is extended or adjusted under 35 U.S.C. 154(b) by 161 days.

(21) Appl. No.: 10/935,937

(22) Filed: Sep. 8, 2004

(65) Prior Publication Data
US 2005/0115616 A1 Jun. 2, 2005

Related U.S. Application Data

(60) Provisional application No. 60/501,296, filed on Sep. 8, 2003.

(51) Int. Cl.
*F16K 15/02* (2006.01)

(52) U.S. Cl. ............... 137/543.23; 137/543.21; 137/540; 251/337

(58) Field of Classification Search .............. 137/524, 137/536, 540, 543.13, 543.17, 543.19, 543.21, 137/543.23; 251/337

See application file for complete search history.

(56) References Cited

U.S. PATENT DOCUMENTS

| 2,449,683 | A | 9/1948 | Akerman et al. ............. 137/53 |
| 3,878,861 | A | 4/1975 | Pareja .................. 137/543.17 |
| 3,937,249 | A | 2/1976 | Suey ......................... 137/540 |
| 4,108,204 | A | 8/1978 | Day ..................... 137/543.13 |
| 4,838,300 | A | 6/1989 | Seabase ..................... 137/224 |
| 5,349,984 | A | 9/1994 | Weinheimer et al. .. 137/543.21 |

*Primary Examiner*—John Rivell
(74) *Attorney, Agent, or Firm*—Holland & Knight LLP

(57) ABSTRACT

A check valve comprising a poppet urged by a conical spring to annularly seal uniformly around its entire periphery to assure more uniform cracking pressure about its entire periphery. The cracking pressure may be adjusted by means of an adjustable plate which reduces the length of the conical spring and thereby increase the amount of force exerted by the spring onto the poppet into sealing engagement, thereby increasing the cracking pressure.

20 Claims, 6 Drawing Sheets

CHECK VALVE

CROSS-REFERENCE TO RELATED APPLICATIONS

This application claims priority of provisional application No. 60/501,296, filed Sep. 8, 2003, the disclosure of which is hereby incorporated by reference herein.

BACKGROUND OF THE INVENTION

1. Field of the Invention

This invention relates to check valves. More particularly, this invention relates to check valves having presettable and adjustable cracking pressures.

2. Description of the Background Art

Presently, there exist many types of check valves designed to allow the flow of a fluid such as a gas in one direction but to block or "check" the flow of the fluid in the opposite direction. The amount of fluid force required to open the poppet of the valve in the un-checked direction is often referred to as the cracking pressure. Typically, the cracking pressure of a check valve is determined by the spring constant of the internal spring which constantly urges the poppet into a sealing position until unseated therefrom once the cracking pressure is attained.

A predetermined cracking pressure of a check valve is desired when check valves are used in conjunction with inflatable articles such as life vests and life rafts. Specifically, a check valve having a predetermined cracking pressure allows the inflatable to be inflated by means of a gas cartridge or the like to assure that the inflatable is inflated to a preset internal pressure. Thus, by allowing excess gas to be exhausted, over-capacity gas cartridges can be employed to inflate the inflatable to ensure that the inflatable is fully inflated to a preset internal pressure in all environments.

Therefore, it is an object of this invention to provide an improvement which overcomes the aforementioned inadequacies of the prior art devices and provides an improvement which is a significant contribution to the advancement of the oral inflation art.

Another object of this invention is to provide a check valve having an increased flow rate.

Another object of this invention is to provide a check valve having a structure composed of a minimal number of parts to increase its reliability while decreasing cost of manufacture and assembly.

Another object of this invention is to provide a check valve having a design that equalizes the sealing force of the poppet around its entire periphery to assure that the check valve is cracked uniformly about the periphery of the poppet.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises a check valve having a simple design with fewer parts than conventional prior art check valves to achieve increased reliability while reducing manufacturing and assembly costs. The check valve of the invention further achieves an increased flow rate upon cracking due to its simplistic yet ingenious design.

Finally, the poppet of the check valve of the invention cooperates with a conical spring to assure that it seals uniformly around its entire periphery facilitating more uniform cracking pressure about its entire periphery.

In another embodiment of the check valve of the invention, the cracking pressure is adjustable by means of a threaded adjustable plate which cooperates with the conical spring to reduce the length thereof and thereby increase the amount of force exerted by the spring onto the poppet into sealing engagement, thereby increasing the cracking pressure.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
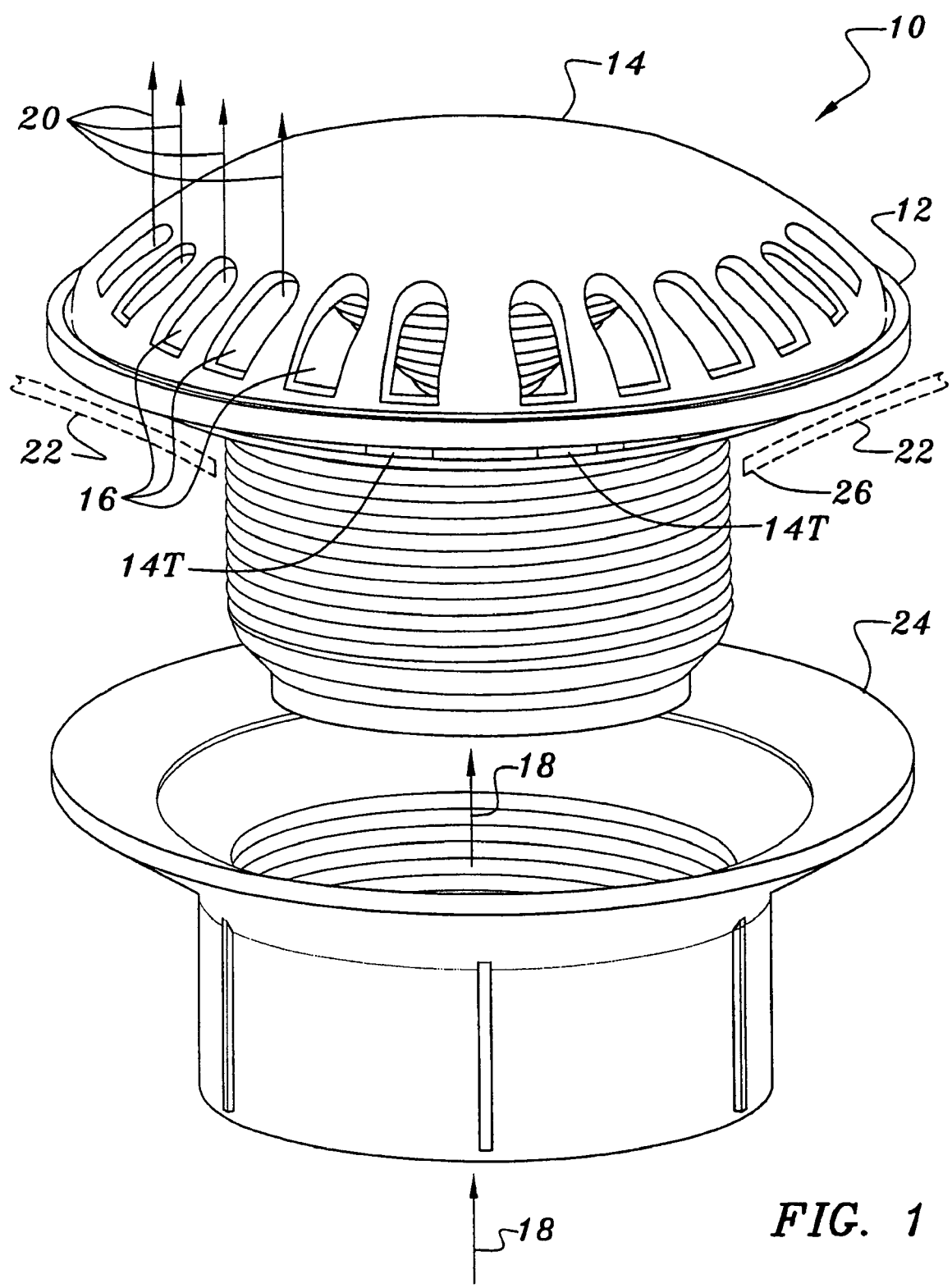
FIG. 1 is a perspective view of the first embodiment of the check valve of the invention.

The check valve 10 of the invention comprises a body 12 to which is mounted a cap 14 having a plurality of flow openings 16 about its periphery allowing fluid to flow in the direction of arrows 18 through the body 12 to then be exhausted from the check valve 10 via openings 16 as shown by arrows 20.

Body 12 may be connected about an opening in an inflatable, shown in phantom by reference numeral 22, through the use of a threaded flange 24 that sealingly captures the edge 26 of the opening in the inflatable 22.

Figure 2:
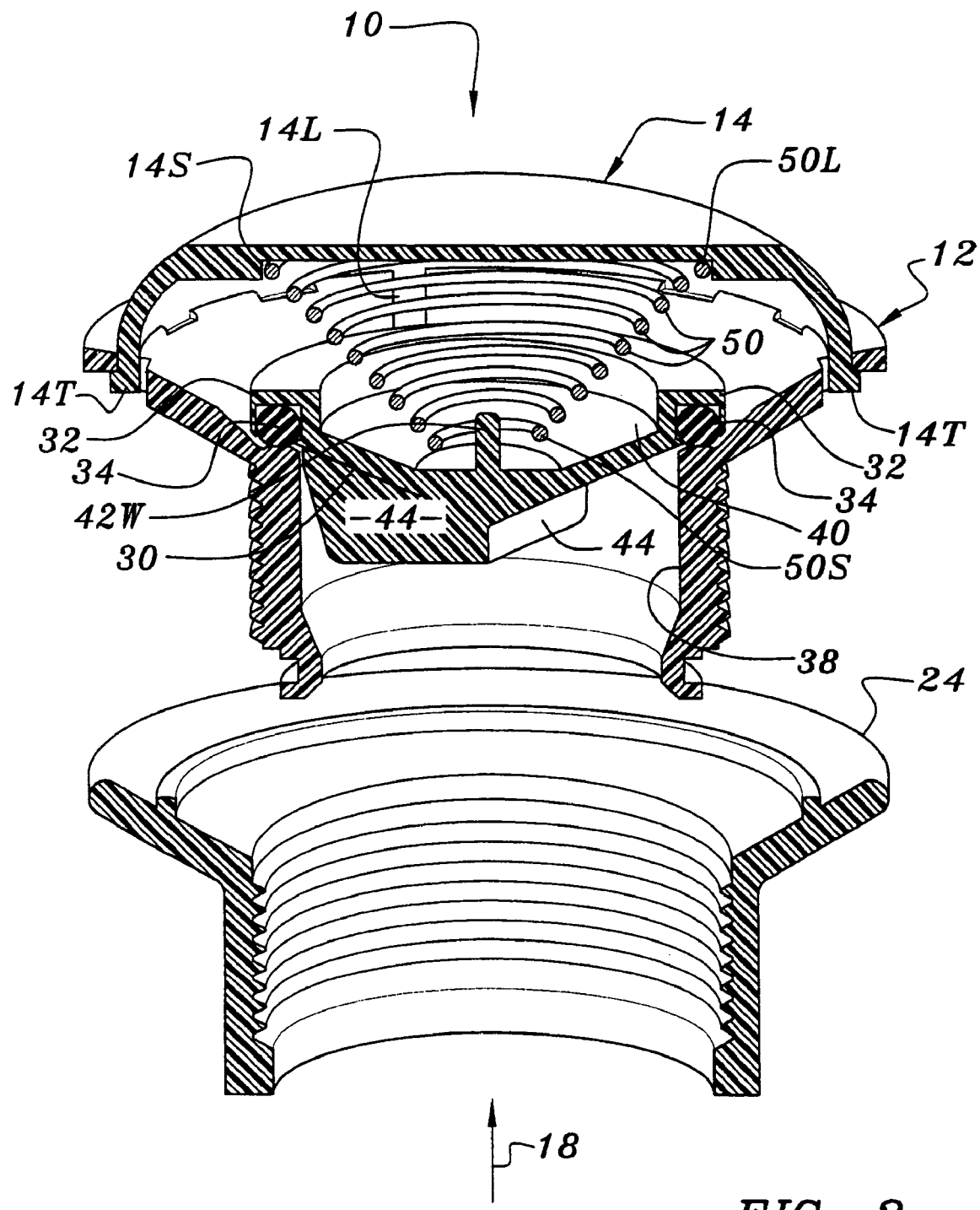
FIG. 2 is a perspective view, partially cut-away, of the first embodiment of the invention.
Figure 3:
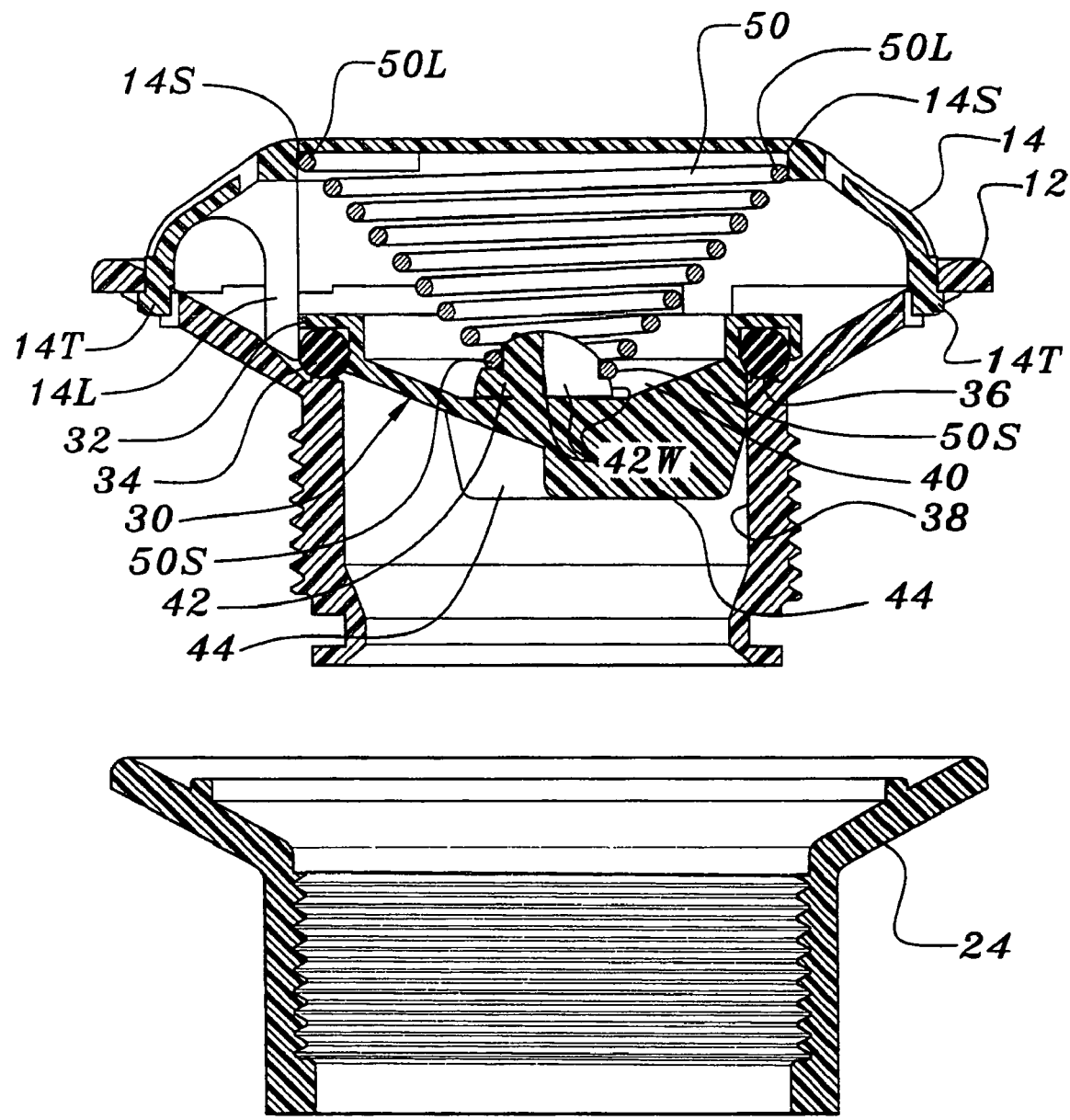
FIG. 3 is a perspective view, partially cut-away, of the first embodiment of the invention.

As shown in FIGS. 2 and 3, check valve 10 of the invention comprises a poppet 30 having an annular groove 32 in which is positioned an annular O-ring 34 that seats on an annular seat 36 formed at the end of the lumen 38 of the body 12.

The poppet 30 includes a concave portion 46 having an upstanding protrusion 42 extending from the inside center thereof. Protrusion 42 comprises four interior webs 42W positioned at 90 degree intervals and forming a semi-spherical outer configuration. Poppet 30 further comprises three exterior webs 44, slightly tapered inwardly, from the lumen 38 of the body 12.

Cap 14 comprises a plurality of tabs 14T that snap into corresponding slots formed in the outer periphery of the cap 12 to securely retain the cap 14 into position. Cap 14 further comprises a plurality of downwardly extending legs 14L, such as three positioned at 120 degree intervals, to entrain the poppet 30 therebetween. The legs 14L coupled with the exterior webs 44 assure that the poppet 30 may reciprocate upwardly within cap 14 without tilting sideways out of alignment where it may potentially jam.

Finally, the check valve 10 of the invention comprises a conical spring 50 having its uppermost largest diameter coil 50L captured by an annular step 14S formed in the underside of the cap 14. The lowermost smallest diameter coil 50S is dimensioned to be appreciably less in diameter than the outer diameter of the protrusion 42 such that when the coil 50S is seated thereon, poppet 30 is allowed to pivot universally in all directions. The ability of the poppet 30 to pivot universally by virtue of the protrusion 42 pivoting within the coil 50S, assures that the O-ring 34 of the poppet 30 will be forced into sealing engagement with the annular seat 36 in a highly uniform manner about its entire periphery. Consequently, uniform cracking of the poppet 30 about its entire periphery is achieved.

Figure 4:
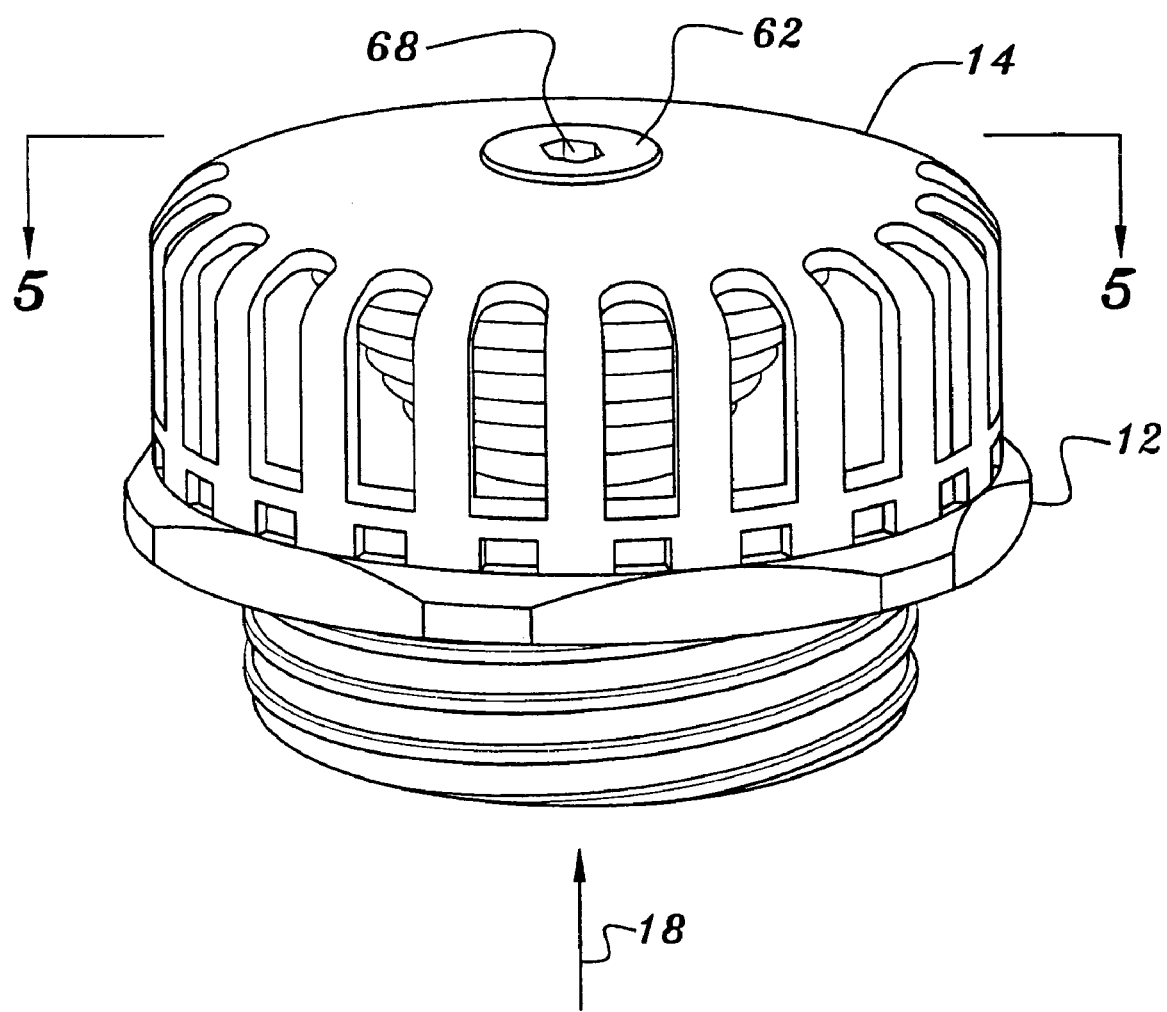
FIG. 4 is a perspective view of the second embodiment of the check valve of the invention.
Figure 5:
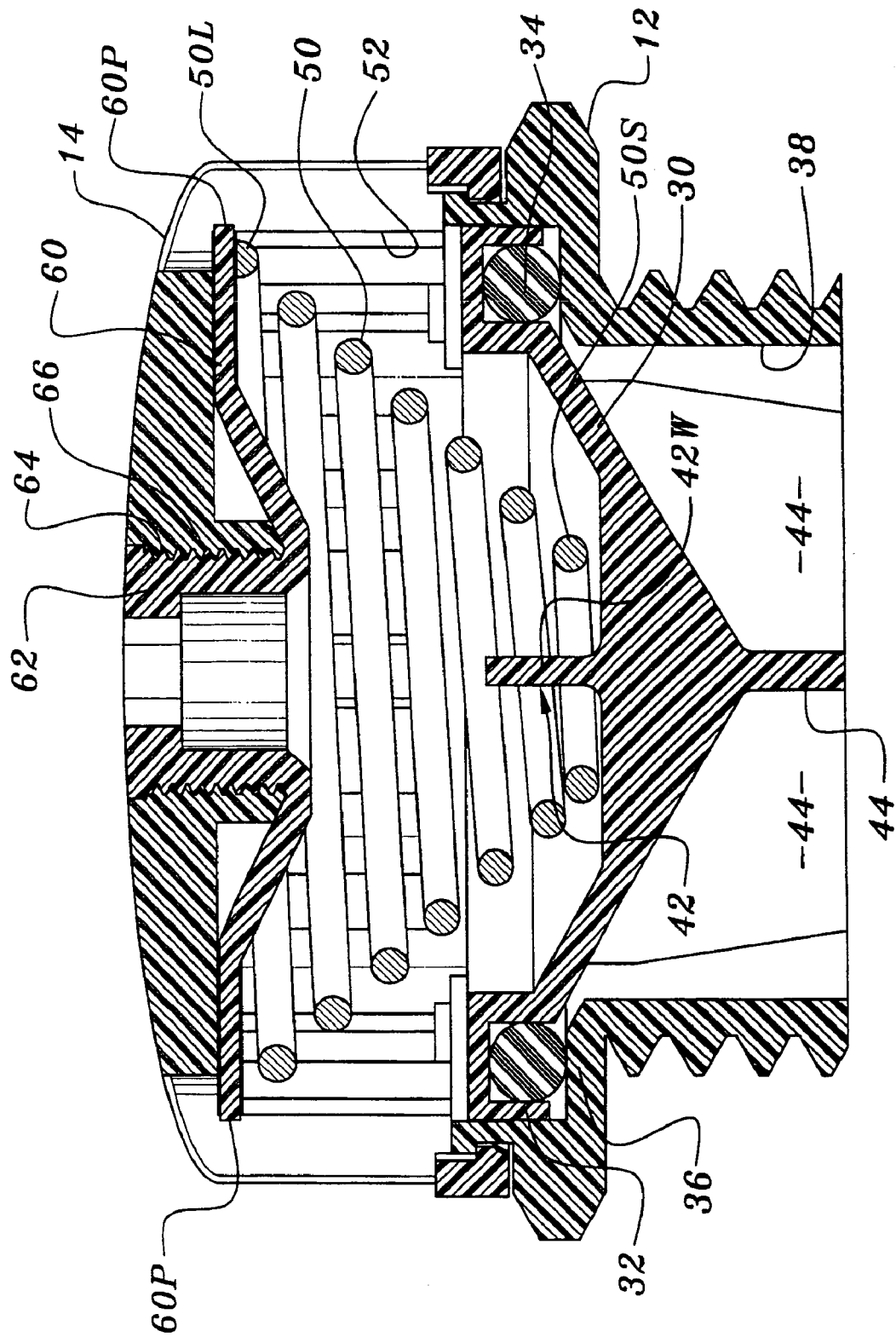
FIG. 5 is a cross-sectional view of FIG. 5 along lines 5—5.

Referring now to FIGS. 4 and 5, the second embodiment of the check valve 10 of the invention comprises a similar body 12 with a cap 14 having flow openings 20 allowing fluid flow 18 to flow through the valve 10 in the unchecked flow direction. Similarly, the second embodiment of the check valve 10 of the invention comprises a conical spring 50 entrained between the cap 14 and a poppet 30 to urge its O-ring 34 in sealing engagement with the annular seat 36.

The poppet 30 further includes exterior webs 44 which prevent the poppet from becoming canted with the lumen 38. However, due to the specific configuration of the cap 14, in the second embodiment, the downward depending legs 14L of the cap 14 of the first embodiment need not be included since the annular groove 32 moves in alignment with the lumen 52 of the cap 14.

In the second embodiment, poppet 30 similarly includes an upstanding center protrusion 42 with four webs 42W forming an outer semi-spherical configuration on which is seated the lowermost smaller diameter coil 50S of the spring 50.

Unlike the first embodiment, the second embodiment of the check valve 10 comprises an adjustable plate 60 having a center boss 62 with external threads 64 for threaded engagement with a threaded hole 66 formed in the center of the cap 14. Boss 62 may be provided with a hex indentation 63 for receiving a hex or other tool.

Plate 60 extends in a somewhat planar configuration from the boss 62 to a position between the uppermost larger diameter spring coil 50L and the underside of cap 14. Upon rotation of the boss 62 in a clockwise direction, plate 60 is caused to move inwardly to further compress the conical spring and thereby increase the cracking pressure of the check valve 10. The outer periphery of the plate 60 may be provided with radial protuberances 60P to engage into openings 20 and provide indexing of the plate 60 as the plate 60 is rotated to adjust the cracking pressure. The protuberances 60P may be of the same width as the openings 20 or, if smaller, may be asymmetrically positioned to provide accurate indexing.

Figure 6:
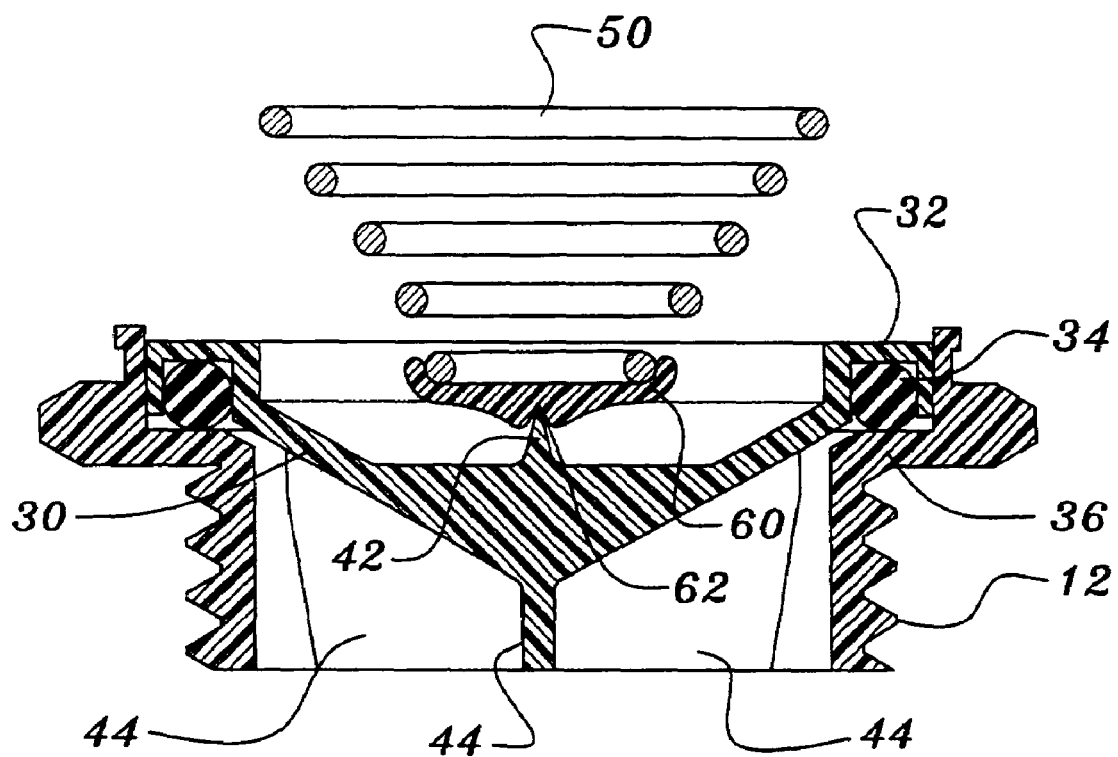
FIG. 6 illustrates an alternative embodiment of centering the conical spring to assure uniform sealing of the poppet.

FIG. 6 illustrates an alternative embodiment for free-floating of the poppet 30 to assure uniform annular indexing of its O-ring 34 on annular seat 36. Specifically, protrusion 42 is configured to achieve a conical apex point for universal engagement into a corresponding center seat 62 formed in a balance plate 60. The balance plate 60 assures that only a central force is exerted onto the poppet 30 thereby achieving uniform annular sealing.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A check valve comprising in combination:
   a body;
   a cap affixed to said body;
   a poppet positioned within said body, said poppet having an annular sealing member for annular sealing engagement with a seat formed within said body, said poppet further including a center protrusion extending interiorly therefrom; and
   a conical spring entrained between said cap and said protrusion;
   whereby said protrusion may pivot relative to said conical spring to assure uniform sealing of said sealing member with said annular seat.

2. The check valve as set forth in claim 1, wherein said cap having comprises a plurality of flow openings about its periphery allowing fluid to flow through said body to then be exhausted from the check valve.

3. The check valve as set forth in claim 1, wherein said body is connected about an opening in an inflatable through the use of a threaded flange that sealingly captures an edge of said opening in said inflatable.

4. The check valve as set forth in claim 1, wherein said poppet includes an annular groove in which is positioned an annular sealing member.

5. The check valve as set forth in claim 1, wherein said poppet comprises a concave portion having an upstanding protrusion extending from the inside center thereof.

6. The check valve as set forth in claim 5, wherein said protrusion comprises interior webs forming a semi-spherical outer configuration.

7. The check valve as set forth in claim 5, wherein said poppet comprises exterior webs, slightly tapered inwardly, from a lumen of said body.

8. The check valve as set forth in claim 1, wherein said cap comprises a plurality of tabs that snap into corresponding slots formed in the outer periphery of said body to securely retain said cap to said body.

9. The check valve as set forth in claim 1, wherein said cap comprises a plurality of downwardly extending legs to entrain said poppet therebetween.

10. The check valve as set forth in claim 1, wherein said conical spring includes an uppermost largest diameter coil captured by an annular step formed in the underside of the cap.

11. The check valve as set forth in claim 1, wherein said conical spring includes a lowermost smallest diameter coil dimensioned to be appreciably less in diameter than an outer diameter of said center protrusion such that when said coil spring is seated thereon, said poppet is allowed to pivot universally in all directions.

12. The check valve as set forth in claim 1, further including an adjustable plate positioned between an uppermost larger diameter spring coil of said conical spring and an underside of cap.

13. The check valve as set forth in claim 12, wherein said adjustable plate comprises a center boss with external threads for threaded engagement with a threaded hole formed in a center of said cap.

14. The check valve as set forth in claim 13, wherein said boss comprises an indentation for receiving a hex or other tool allowing rotation thereof to cause said plate to move inwardly to further compress said conical spring and thereby increase the cracking pressure.

15. The check valve as set forth in claim 13, wherein an outer periphery of said adjustable plate comprises radial protuberances that engage into openings of said cap to provide indexing of said adjustable plate to adjust the cracking pressure.

16. The check valve as set forth in claim 15, wherein said protuberances are asymmetrically positioned to provide accurate indexing.

17. The check valve as set forth in claim 1, wherein said protrusion comprises a conical apex point on which is seated a balance plate.

18. The check valve as set forth in claim 17, wherein said balance plate comprises a center seat that receives said conical apex point.

19. A check valve comprising in combination:

a body;

a cap affixed to said body, said cap comprising a plurality of flow openings about its periphery allowing fluid to flow through said body to then be exhausted from the check valve and a plurality of tabs that snap into corresponding slots formed in an outer periphery of said body to securely retain said cap to said body;

a poppet positioned within said body, said poppet including an annular groove in which is positioned an annular sealing member for annular sealing engagement with a seat formed within said body, a center protrusion extending interiorly from said poppet, said protrusion comprising a semi-spherical outer configuration, a concave portion having an upstanding protrusion extending from the inside center thereof, exterior webs;

said cap comprising a plurality of downwardly extending legs to entrain said poppet therebetween;

a conical spring entrained between said cap and said protrusion, said conical spring including an uppermost largest diameter coil captured by an annular step formed in the underside of said cap and a lowermost smallest diameter coil dimensioned to be appreciably less in diameter than an outer diameter of said center protrusion such that when said coil spring is seated thereon, said poppet is allowed to pivot universally in all directions, whereby said protrusion may pivot relative to said conical spring to assure uniform sealing of said sealing member with said annular seat.

20. A check valve comprising in combination:

a body;

a cap affixed to said body, said cap comprising a plurality of flow openings about its periphery allowing fluid to flow through said body to then be exhausted from the check valve and a plurality of tabs that snap into corresponding slots formed in an outer periphery of said body to securely retain said cap to said body, said cap further including an adjustable plate positioned on an underside of said cap, said adjustable plate comprising a center boss with external threads for threaded engagement with a threaded hole formed in a center of said cap, said adjustable plate further comprising radial protuberances that engage into said openings of said cap to provide indexing of said adjustable plate to adjust the cracking pressure;

a poppet positioned within said body, said poppet including an annular groove in which is positioned an annular sealing member for annular sealing engagement with a seat formed within said body, a center protrusion extending interiorly from said poppet, said protrusion comprising a semi-spherical outer configuration, a concave portion having an upstanding protrusion extending from the inside center thereof, exterior webs;

a conical spring entrained between said adjustable plate and said protrusion, said conical spring including an uppermost largest diameter coil engaging an underside of said adjustable plate and a lowermost smallest diameter coil dimensioned to be appreciably less in diameter than an outer diameter of said center protrusion such that when said coil spring is seated thereon, said poppet is allowed to pivot universally in all directions, whereby said protrusion may pivot relative to said conical spring to assure uniform sealing of said sealing member with said annular seat.

* * * * *